INVENTOR.
CHARLES E. HICKS
BY Arthur L. Wade
ATTORNEY

March 22, 1960

C. E. HICKS 2,929,151

AUTOCLAVE CONTROL SYSTEM

Filed Jan. 16, 1956

INVENTOR.
CHARLES E. HICKS
BY
Arthur L. Wade
ATTORNEY

United States Patent Office 2,929,151
Patented Mar. 22, 1960

2,929,151

AUTOCLAVE CONTROL SYSTEM

Charles E. Hicks, Westfield, N.J., assignor to Bailey Meter Company, a corporation of Delaware Application January 16, 1956, Serial No. 559,397

6 Claims. (Cl. 34—45)

The present invention relates to the control of a heat treating process. There are various varieties of autoclaves, or pressurized heating vessels, and a large variety of materials heat-treated in them by various heating mediums. The present invention is disclosed by the use of steam as a heating medium in an autoclave in which porous material is brought to a predetermined temperature and cooled as quickly as possible.

Steam, as a heating medium, is comparatively inexpensive. However, the use of steam on porous material, within an autoclave, presents a problem. If, after the material has been brought up to the desired temperature, its external pressure is dropped below the saturation pressure of the moisture absorbed by the material, the moisture will flash into steam, exploding the material and rendering it worthless. The present invention was conceived to guard against this occurrence.

The responsive elements of the control system are exposed to the total pressure within the autoclave, the temperature external of the heat-treated material and the temperature internal of the heat-treated material. The control system utilizes these three variables to regulate the entry of steam and air into the autoclave, cooling water for the product of the autoclave and blowdown of the autoclave pressure. Included in the control system is an electric network for determining the sequence of operating the regulators of steam, air, water and blowdown. A drawing disclosure depicts the pertinent elements of the actual reduction to practice of the invention. A graph and diagram are also supplied to give further understanding of the function of the elements and their cooperation in the complete system.

A primary object of the invention is to control the operating cycle of an autoclave.

A further object of the invention is the control of a heating and pressure cycle within an autoclave.

Still another object of the invention is to bring the material in an autoclave up to a predetermined temperature and lower it to a predetermined temperature while maintaining a predetermined differential between the total pressure within the autoclave and the derived internal saturation partial pressure, or the external saturation partial pressure, of the material heat-treated in the autoclave.

A more specific object of the invention is to prevent moisture within heat-treated material from flashing into steam.

An actual reduction to practice of the present invention is applied to the control of an autoclave which is used to heat-treat asbestos material. In the industry producing this material, volume production is of the utmost importance. To obtain satisfactory volume, it is necessary that the autoclave be so controlled that a particular batch of material can be heat-treated and removed in a minimum amount of time in order that the autoclave be available for its next batch.

Figure 1:
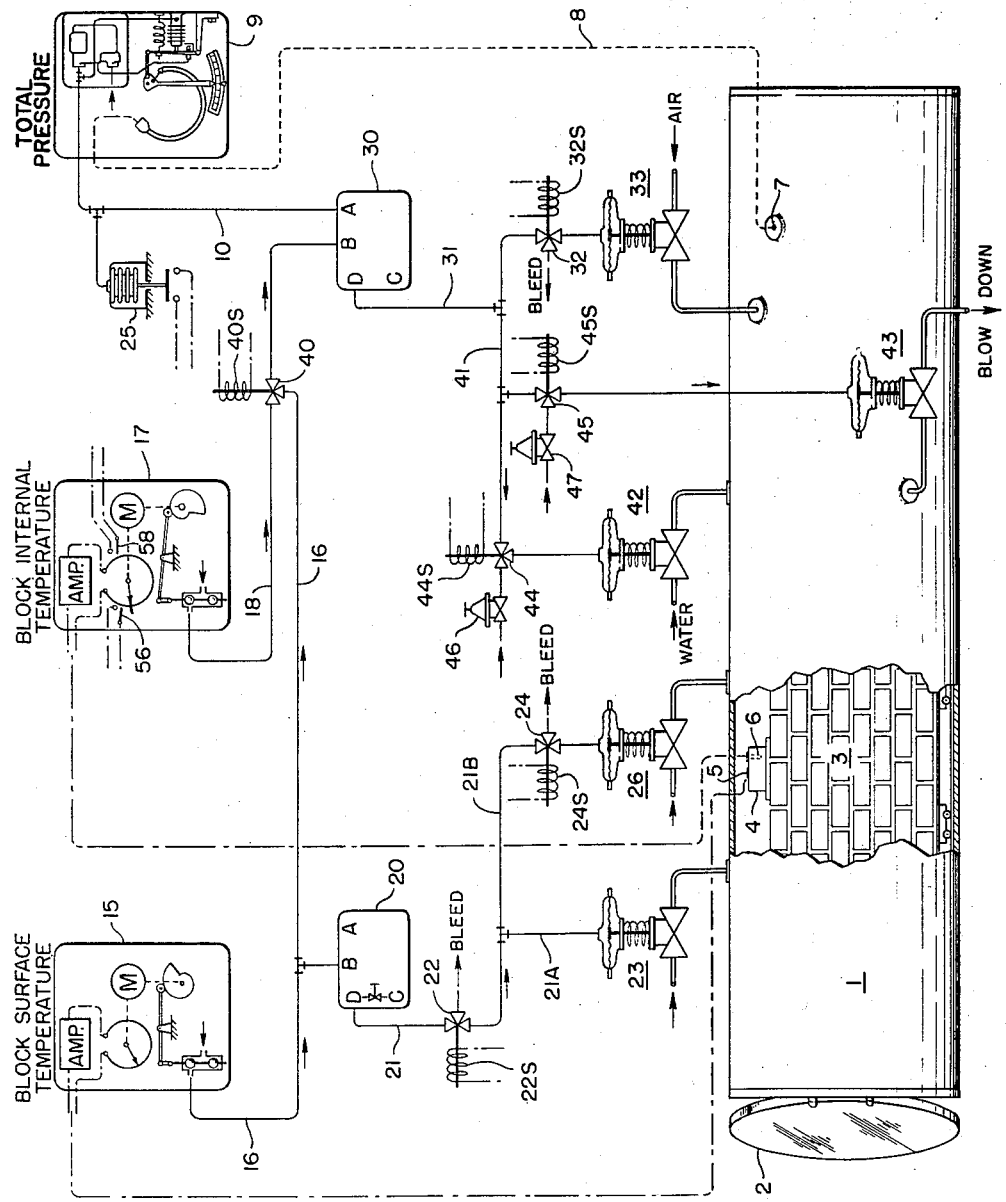
Fig. 1 is a diagrammatic representation of the major elements of a control system carrying out the objects of the invention.

Referring specifically to Fig. 1, an autoclave structure has been diagrammatically depicted at 1. The door 2 has been shown ajar in order to appreciate that the autoclave 1 may take a cylindrical form. Further, autoclave 1 has been partially sectioned in order to appreciate that it contains a charge of asbestos blocks 3. One of these blocks, block 4, is designated as a test block. A thermocouple 5 is mounted on the surface of this test block. A hole has been punched into the block and a thermocouple 6 has been inserted in order to sense the internal temperature of the block.

The total internal pressure of the autoclave is sensed at tap 7. A pipe 8 transmits this total pressure to a pneumatic transmitter 9. Transmitter 9 establishes an output pressure in pipe 10, representative of the total pressure within autoclave 1. Transmitter 9 may take the form of the structure disclosed in Patent 2,737,963 of H. H. Gorrie and J. F. Shannon, S.N. 289,402, filed May 22, 1952. The internal structure of the transmitter has been illustrated to appreciate that the pressure of pipe 8 is received within a Bourdon tube which mechanically actuates a pneumatic couple whose output, in turn, is amplified and established in pipe 10.

Surface thermocouple 5 is the primary element of a balanceable electric network included in meter 15. Meter 15 may take the form of structure disclosed in an application by P. S. Dickey S.N. 236,612, filed July 13, 1951, and now abandoned. Sufficient details of the internal structure of this meter have been illustrated to appreciate that a motor maintains the electric network in balance and simultaneously actuates a cam which controls the output of a pneumatic relay. The output of meter 15 is a pneumatic pressure in pipe 16, representative of the temperature to which thermocouple 5 is exposed.

Meter 15 is a means whereby the electrical characteristic of thermocouple 5 is transduced into pneumatic pressure in pipe 16. The cam-link between the balancing motor of the electric network and the pneumatic relay may be given a predetermined shape. In this instance, it is desired that the cam be shaped so that the pneumatic pressures established in pipe 16 will represent the values of saturation pressure of steam equivalent to the temperatures to which thermocouple 5 is exposed.

Internal thermocouple 6 is a primary element for meter 17. Meter 17 is similar to meter 15 and its cam is shaped in order that its pneumatic pressure established in pipe 18 represents the saturation pressure of steam equivalent to the temperature to which thermocouple 6 is exposed. The pressures in pipes 16 and 18 may then be regarded as either representative of temperature or the derived values of saturation pressure of steam for that temperature. Regarding the pressure in pipe 16 proportional to the saturation pressure for steam within the autoclave, and pressure within pipe 18 representative of the saturation pressure of steam internal of the charge 3, the control system disclosed maintains the pressures within pipe 16 or pipe 18 a predetermined amount less than the pressure in pipe 10. With these pressure differentials maintained, sequentially, the moisture within the charge 3 is never allowed to flash into steam and explode the material.

Two sources of steam are employed to supply heat to the autoclave. The actual reduction to practice referred to utilized a source of 180 p.s.i. and a second source of 250 p.s.i. The present disclosure follows the actual reduction to practice in this respect. Both sources of steam are under the primary control of the pressure in pipe 16.

A standardizing relay 20 is disclosed as responsive to the pressure in pipe 16. Relay 20 may take the form of structure disclosed in an application by H. H. Gorrie S.N. 311,098, filed September 23, 1952, now Patent No. 2,776,669. The output of relay 20 is established in pipe 21. The pressure in pipe 21 may have a relationship to the pressure in pipe 16 which is determined by the characteristics of relay 20 under the teachings of the Gorrie application. Essentially, the relay 20 establishes pressures in pipe 21 which go to a maximum when the temperature to which thermocouple 5 is exposed is below a predetermined value. Valve 22 is a three-way valve which determines whether the pressure of pipe 21 will be imposed upon branches 21A and 21B or whether they will be bled to atmosphere. When valve 22 connects pipe 21 to its branches 21A and 21B, regulator 23 responds to admit the lower pressure steam into the autoclave. When the pressure in the autoclave is raised to approximately 150 p.s.i., three-way valve 24 is operated from the contacts of pressure switch 25 to open branch 21B to regulator 26 to admit the higher pressure steam to the autoclave.

When the predetermined set-point temperature (saturation pressure) of meter 15 is approached, the pressure in pipe 16 will decrease and regulators 23 and 26 will be modulated to hold the temperature-saturation pressure within the autoclave at the predetermined value. In the actual reduction to practice the set-point value of meter 15 is 388°.

While injecting steam into the autoclave to elevate the temperature to the 388° standard, and hold it there, it is desirable to maintain a predetermined differential between the total pressure in the autoclave and value of the saturation pressure for the temperature in the autoclave. This saturation pressure-temperature may be regarded as that of the partial pressure of the steam within the autoclave. The total pressure is regulated by introducing air into the autoclave. With a satisfactory differential between the total and the partial pressures maintained over the heating portion of the cycle, the transition to control of the differential between the total pressure and the derived saturation pressure of moisture within the charge can be accomplished smoothly.

To compare the pressure of pipe 16 with the pressure of pipe 10, relay 30, similar to relay 20, receives these pressures in a comparative relationship. Relay 30 is adjusted to establish its maximum output (15 p.s.i.) when the differential between the pressure of pipe 10 and pressure of pipe 16 is at, or smaller than, the desired value. Three-way valve 32 either isolates the pressure in pipe 31 from regulator 33 and vents it, or allows it to position regulator 33 in controlling the amount of air introduced into autoclave 1. It is not deemed necessary to show a source for this air supply, but merely regulator 33, which determines the amount of air introduced into the autoclave in accordance with relationship between the pressures in pipe 16 and pipe 10. The result of this control of regulator 33 is to maintain the total pressure in the autoclave satisfactorily higher than the saturation partial steam pressure therein.

The operation of the autoclave, over the heating portion of the cycle, should now be clear. Steam is introduced into the autoclave to bring the internal temperature of the charge to a predetermined value. In bringing the internal temperature of the charge to its predetermined value, the internal temperature of the autoclave is raised as rapidly as is compatible with the capacity of the steam regulators and the air regulator, bringing the temperature within the autoclave up to the predetermined temperature desired while maintaining a satisfactory differential between the total pressure of the autoclave and the derived saturation partial pressure of the steam therein. When the autoclave has been brought up to temperature it is held for a "soaking" period in order to allow the internal temperature of the charge to reach the desired temperature. Once the internal temperature of the charge has reached the predetermined value of 388°, the asbestos material has been properly cured. It is then necessary to cool the charge as quickly as possible in order that the autoclave may be prepared for its next charge.

Sprayed water is utilized to cool the charge. The problem of control is acute and this is evident when it is appreciated that spraying water on the external surface of the charge may drop the pressure in the autoclave faster than the derived saturation pressure of the moisture internal of the charge. If the saturation pressure of the moisture internal of the block becomes equal to the total pressure within the autoclave, the moisture will flash into steam and increase its volume by substantially 800 times. The charge would then, in effect, blow up and render the material worthless.

When it is time to cool the charge by water spray, the control system in which the invention is embodied automatically switches from control by the difference between the total pressure in the autoclave and saturation partial steam pressure in the autoclave to a difference between total pressure in the autoclave and the derived value of saturation pressure of moisture internal of the charge. To specifically make this change in control index, valve 40 is used to isolate the pressure of pipe 16 from relay 30 and to substitute therefor the pressure of pipe 18. Valve 40 is operated from contacts in meter 17 when the desired value of temperature is reached internal of the charge. Thereafter, the control pressure of pipe 31 represents the differential between the derived saturation pressure of moisture internal of the charge and the total pressure within the autoclave.

With valve 40 actuated to couple relay 30 and pipe 18 together, valve 22 is actuated to cut off all steam supplied the autoclave. With the supply of heat cut off completely, the pressure in pipe 18 will begin to drop and increase the differential between the pressures of pipe 18 and pipe 10. The pressure in pipe 31 will begin to decrease from 15 p.s.i.

Attention is next directed to pipe 41, branching from pipe 31. The pressure in pipe 41 is utilized to position regulators 42 and 43. Regulators 42 and 43 respond to pressure in a direction reverse to that of regulator 33, and over different ranges of pressure. Regulator 42 opens to admit spray water onto the autoclave charge as the pressure in pipe 41 decreases from 15 p.s.i. to 11 p.s.i. Regulator 43 opens to blowdown all pressure from the autoclave as the pressure in pipe 41 decreases from 7 p.s.i. to 3 p.s.i. Regulator 33 closes to cut off the air supply to the autoclave as the pressure in (pipe 41–pipe 31) goes from 11 p.s.i. to 7 p.s.i.

If the spray water, admitted by regulator 42, reduces the total pressure within the autoclave faster than the derived value of saturation pressure internal of the charge, the differential between pipe 18 and pipe 10 may decrease to send the output of relay 30 toward 15 p.s.i., closing regulator 42 and opening regulator 33 to the air supply. Thus, the output pressure of relay 30 in pipe 31 will alternate between building up the total pressure of the autoclave with regulator 33 and water-spraying the charge with regulator 42 to maintain a desired differential between the total pressure in the autoclave and the critical, derived, saturation partial pressure of the moisture internal of the charge.

Eventually, depending upon radiation, leakage from the autoclave, spray water temperature, capacity of the charge, etc., the internal saturation pressure-total autoclave pressure difference will be maintained satisfactorily by water spray only. When the air regulator 33 has been fully closed the blowdown regulator 43 begins to open to atmosphere in order that atmospheric pressure will be obtained prior to opening the autoclave and removing its charge.

Reference to valves 22 and 24 have already been made in connection with regulators 23 and 26. With valve 22, steam regulator 23 is either connected to the pressure of pipe 21 or bled to atmosphere. With valve 24, steam regulator 26 is either connected to the pressure of pipe 21B or bled to atmosphere. When valve 40 connects pipe 18 and relay 30, valve 22 bleeds both regulator 23 and regulator 26 to atmosphere, closing the steam supply to autoclave 1.

Reference has also been made to valve 32 as either connecting regulator 33 to the pressure of pipe 31 or atmosphere. Valve 32 connects regulator 33 to the pressure of pipe 31 for both the heating and cooling portions of the cycle of autoclave operation. Pushbutton 50 starts the cycle and the low contact 58 of meter 17 terminates the cycle. Reference is now made to valves 44 and 45.

Valve 44 connects regulator 42 to either the pressure of pipes 41 and 31 or to a constant air supply of 15 p.s.i. Valve 45 connects regulator 42 to either the pressure of pipes 41 and 31 or to a constant air supply of 7 p.s.i. Prior to the pressures of pipes 41 and 31 taking over the control of regulators 42 and 43 from their closed positions they must have been held closed by their constant air supplies through reducing valves 46 and 47. Valve 44 and valve 45 will be actuated together to shift the control of regulators 42 and 43 to the pressure of pipe 41 when the high contact 56 of motor 17 is closed. As the pressure in pipe 41 decreases from 15 p.s.i. regulators 42 and 43 will be sequentially opened to cool the charge with water and release all pressure from the autoclave. Precise coordination of the valves and regulators is consummated by an electric network energizing the solenoid coils of the three-way valves.

Figure 2:
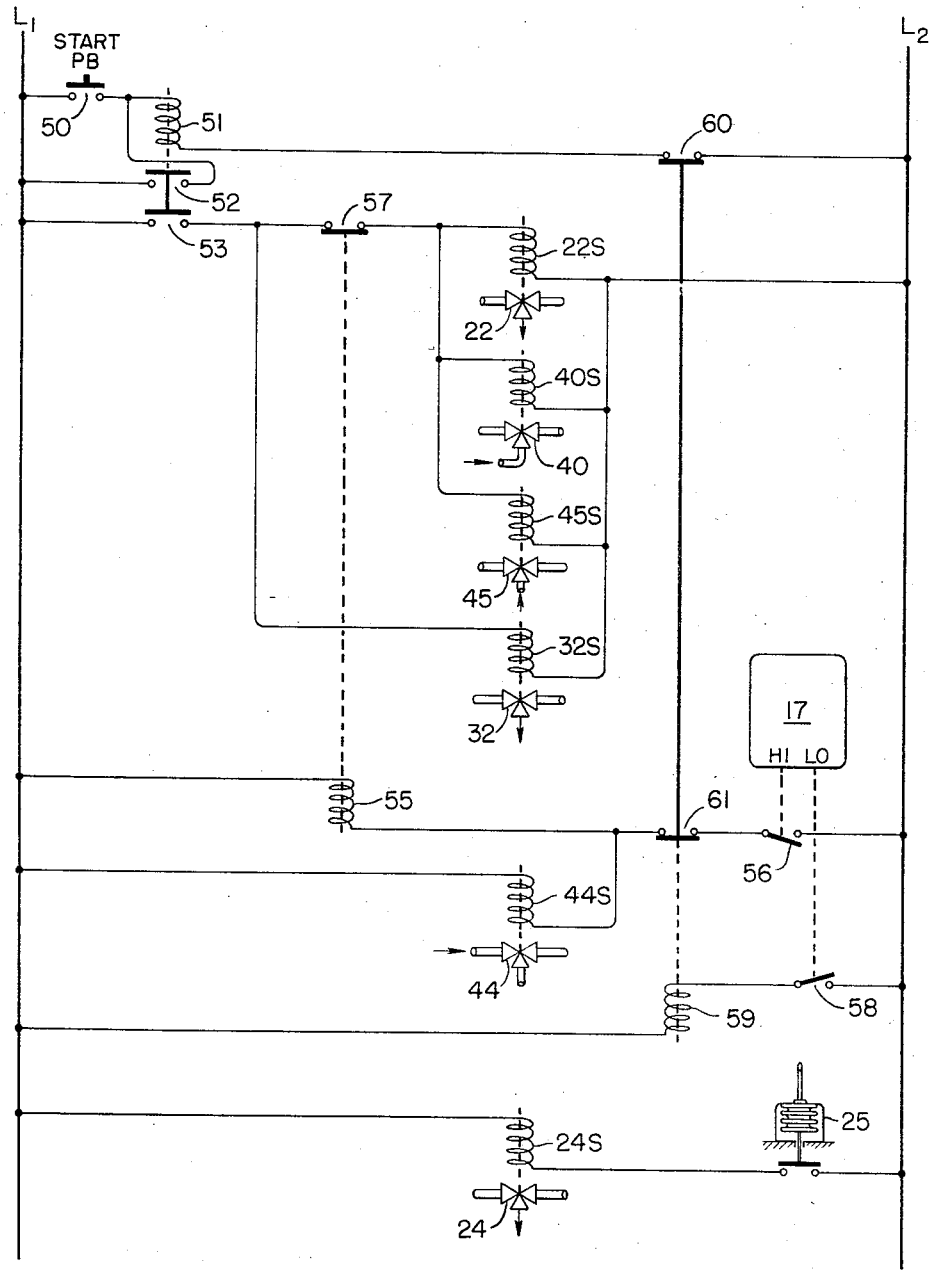
Fig. 2 is a diagrammatic representation of the electric network portion of the control system.

Directing attention to Fig. 2, the electric network, cooperating with the pneumatic signals established by the system of Fig. 1, may be analyzed. The network energizes the solenoid coils of the various valves of Fig. 1. These coils have their circuits completed across the line by either contacts actuated by a manual pushbutton, contacts actuated by meters or by contacts actuated by another solenoid cell. The lines, $L_1$ and $L_2$, have been arranged in parallel with the various coils and contacts in circuit between them.

The entire operation is started by manually closing pushbutton 50. The contacts of pushbutton 50 complete the circuit of coil 51, closing contacts 52 and 53. Contacts 52 short across those of pushbutton 50 so that 50 will be allowed to open but coil 51 will remain energized. Contacts 52 are, then, hold-in contacts.

Contacts 53 complete the circuit of solenoid coil 22S of valve 22, solenoid coil 40S of valve 40, solenoid coil 45S of valve 45 and solenoid coil 32S of valve 32. This actuation of valve 22 imposes the pressure of pipe 21 on pipes 21A and 21B. The actuation of valve 40 imposes the pressure of pipe 16 on relay 30. The actuation of valve 45 isolates regulator 43 from the pressure of pipe 41. Finally, the actuation of valve 32 imposes the pressure of pipe 31 on regulator 33.

The low pressure steam is admitted to the autoclave through regulator 23 until the total pressure within the autoclave reaches 150 p.s.i. As heretofore indicated, pressure switch 25, responsive to pressure of pipe 10 from transmitter 9 completes the circuit of the solenoid coil 24S of valve 24, through its contacts, to allow the pressure of pipe 21B to position regulator 26. The pressure and temperature within the autoclave continues to rise until the set-point of 388° is reached. Regulator 23 is then full open and regulator 26 is then modulated by the pressures in pipe 21 and pipe 21B to maintain the temperature within the autoclave at this value until the internal temperature of the charge has equalized with its external temperature.

When the desired value of internal charge temperature has been reached, meter 17 closes switch 56 to energize solenoid coil 55 and solenoid coil 44S of valve 44. Valve 44 is then opened in order that the pressures of pipe 41 can be imposed upon water spray regulator 42. Simultaneously, as valve 44 is opened, contacts 57 are opened to break the circuits of the solenoid coils of valves 22, 40 and 45. Valve 22 is closed to completely cut off steam to the autoclave. Valve 40 is actuated to substitute the pressures of pipe 18 for those of pipe 16 in relay 30. Valve 45 permits the pressures of pipe 41 to position regulator 43. Valve 32 remains energized in order that the pressures of pipe 31 will continue to position regulator 33. With the circuits of valves 22, 40 and 45 deenergized and with the circuit of valve 44 energized through high-temperature switch 56, the regulation of air by regulator 33 and water by regulator 42 and blowdown by regulator 43 maintains the desired differential between the total pressure within the autoclave and the derived saturation pressure of the moisture internal of the charge until the pressure within the autoclave returns to atmospheric and the temperature of the charge has reached ambient.

When the charge temperature reaches a predetermind low value, switch 58 is closed to energize solenoid coil 59. Solenoid coil 59 controls contacts 60 and 61. Contacts 60 deenergize solenoid coil 51, breaking the circuits of all valves 22, 40, 45 and 32, returning them to their starting positions. Contacts 61 deenergize coil 44S, isolating valve 42 from the pressure of pipe 41, and coil 55, closing contacts 57. Thus, all valves are returned to their positions desired at the start of the cycle. The arrangement for keeping switch 58 from being closed as the charge temperature goes up to close switch 56 and to keep switch 56 closed until after switch 58 is opened by the charge temperature going down to the predetermined value is a matter of mechanical design.

Figure 3:
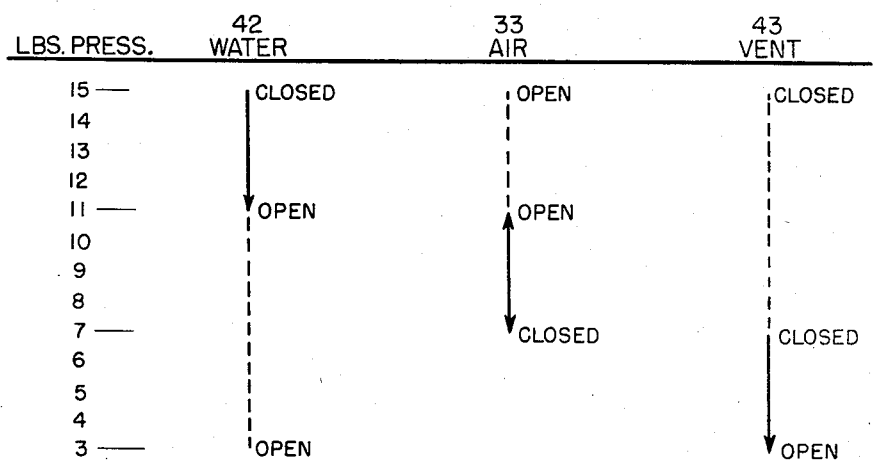
Fig. 3 is a graphical representation of a sequence of operation of certain regulators of the control system.

Returning to the chart of Fig. 3, the operation of regulators 33, 42 and 43 may be further analyzed. These regulators respond to ranges of pressures which abut within a 3–15 p.s.i. range. With the pressure in pipe 31 at 15 p.s.i., the regulators are adjusted so that the water regulator 42 will remain closed, the air regulator 33 will remain open and the blowdown regulator 43 will remain closed.

As the pressure of pipe 31 reduces from 15 p.s.i., water regulator 42 begins to open. At 11 p.s.i. water regulator 42 is wide open and air regulator 33 begins to close. As the pressure in pipe 31 reaches 7 p.s.i., regulator 33 is completely closed. Therefore, between 15 p.s.i. and 7 p.s.i. one or the other of the regulators 42 and 33 are modulating between their opened and closed positions. Thus abutting in their operation, these regulators respond to the pressure in pipe 31–pipe 41 to maintain a desired differential between the pressures in pipe 10 and pipe 18.

When the pressure in pipe 31–pipe 31 reaches 7 p.s.i., water regulator 42 is full open and air regulator 33 is fully closed. With continued reduction in the pressure of pipe 31, the blowdown regulator 43 modulates toward its open position, reaching it at 3 p.s.i. in pipe 31–pipe 41. The cycle of operation of the autoclave has then been completed, and the autoclave may be opened and the charge removed.

Figure 4:
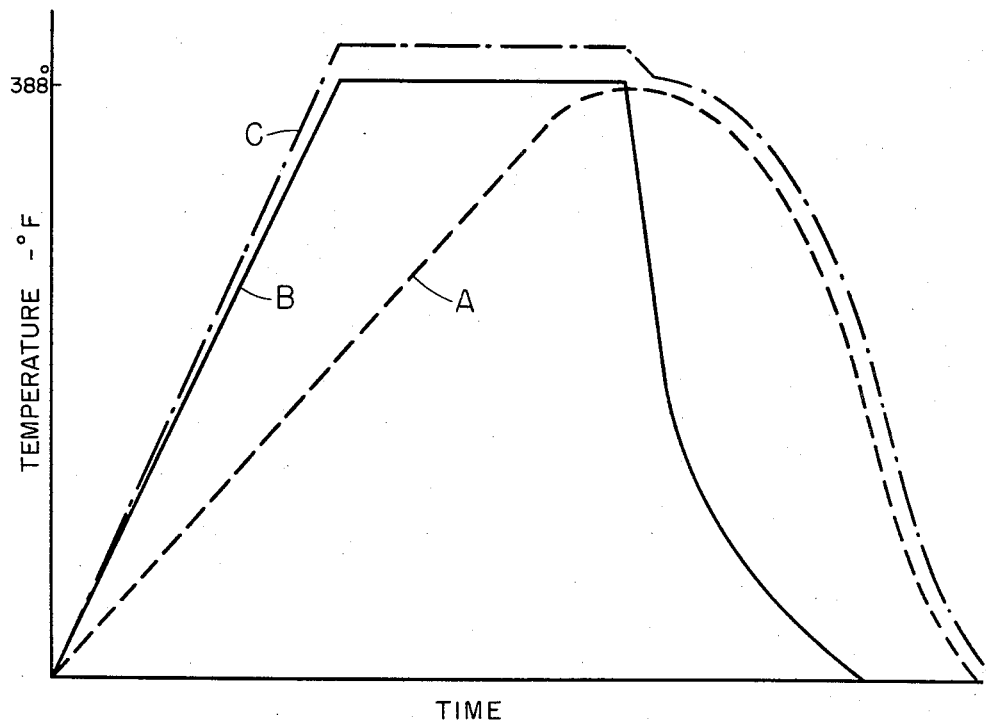
Fig. 4 is a graphical representation of the functional results achieved by the control system.

Referring now to the curves of Fig. 4, a complete perspective of the functional operation of the control system may be appreciated. Curve A of this graph dominates the interpretation. Curve A is the important internal temperature of the charge which is transduced into a control pressure representative of the saturation pressure of moisture for each value of temperature. The curves are plotted in terms of temperature against time, but for the present purposes, they may be alternately regarded as pressure variations within the autoclave. Therefore, curve A rises to the desired value of 388° and is dropped as rapidly as possible to complete the cycle of operation.

Curve B is representative of both the temperature external of the charge and within the autoclave, as well as the saturation partial pressure attributable to the steam therein. Obviously, the slope of curve B, in reaching the desired value of 388°, is determined by the capacity of the charge, the quantity of steam available through the regulators, the size of the autoclave as well as other factors of physical dimension. The flat portion of this curve B represents the steady temperature condition of the soaking period over which the steam regulators 23 and 26 are modulated to maintain the temperature within the autoclave constant until the charge has reached the desired value. When the desired value of internal temperature of the charge has been reached and the spraying of water begins, the supply of steam is cut off and the curve B illustrates how the value of this partial pressure-temperature of steam within the autoclave falls off rapidly.

Curve C is the extremely important pressure within the autoclave which is composed of both air and steam pressure introduced into the autoclave. A fundamental function of the control system in which the invention is embodied is to maintain the value of curve C a predetermined amount higher than that of the other curves. Until curve A has reached its maximum value, relay 30 continuously compares the values of curves B and C to operate regulator 33 in admitting sufficient air to maintain the required differential. When the system switches from a control index of comparing the pressures in pipe 16 to those in pipe 10 to one of comparing the pressures in pipe 18 to those in pipe 10, relay 30 controls regulators 33 and 42 to maintain the desired differential between curves A and C as they both decrease to atmospheric values.

What I claim as new, and desire to secure by Letters Patent of the United States, is:

1. A control system for a heat treating cycle having a heating and a cooling phase, a pressure vessel arranged to receive porous material, first means in the form of a pressure responsive device developing a first control pressure in accordance with the pressure internal of the vessel, second means in the form of a first temperature responsive device developing a second control pressure in accordance with the saturation pressure of the water vapor external of the porous material in the pressure vessel, third means in the form of a second temperature responsive device developing a third control pressure in accordance with the saturation pressure of the water vapor internal of the porous material in the pressure vessel, a pipe for supplying steam under pressure to the vessel to heat the material therein, a steam valve in said pipe for adjusting the rate of steam flow to the vessel operated by said second control pressure during the heating phase, means operated by said third means to maintain said steam valve closed during the cooling phase thereby shutting off the flow of steam to the pressure vessel, a pipe for supplying air under pressure to the vessel, an air valve in said pipe for adjusting the rate at which air is supplied the vessel, a fourth means including a comparing relay receiving the first control pressure and a first connection to the second control pressure, a fifth means including said comparing relay receiving the first control pressure and a second connection to the third control pressure, and means for placing said air valve under the control of the fourth means during the heating phase to maintain a predetermined differential between the first and second control pressures and under the control of the fifth means during the cooling phase to maintain a predetermined differential between the first and third control pressures.

2. The control system of claim 1, including, a pipe for supplying water to the interior of the vessel to cool the porous material therein, a water valve in said pipe for adjusting the rate at which water is supplied under the control of the fifth means, and means operated by said third means to maintain said water valve closed during the heating phase thereby shutting off the flow of water to the pressure vessel.

3. The control system of claim 1 in which the means for transferring the control of the air valve from the fourth to the fifth means includes a 3-way valve arranged to substitute the second connection for the first connection.

4. The control system of claim 3 in which an electric network is included actuated by the third means to cause the 3-way valve to substitute the second connection for the first connection.

5. The control system of claim 4 in which the electrical network includes a circuit for actuating the means maintaining the steam valve closed during the cooling phase.

6. The control system of claim 1 including a regulator for venting the vessel and means for maintaining said regulator closed during the heating phase under the control of said third means.

References Cited in the file of this patent

UNITED STATES PATENTS

| | | |
|---|---|---|
| 1,219,406 | Banks | Mar. 13, 1917 |
| 1,632,829 | Fleissner | June 21, 1927 |
| 2,391,195 | Ross et al. | Dec. 18, 1945 |